United States Patent
Firester

[11] 4,009,933
[45] Mar. 1, 1977

[54] POLARIZATION-SELECTIVE LASER MIRROR

[75] Inventor: Arthur Herbert Firester, Skillman, N.J.

[73] Assignee: RCA Corporation, New York, N.Y.

[22] Filed: May 7, 1975

[21] Appl. No.: 575,364

[52] U.S. Cl. .......................... 350/152; 331/94.5 C; 350/290

[51] Int. Cl.² .......................................... G02B 5/30

[58] Field of Search ................ 331/94.5 C, 94.5 D; 350/147, 152, 162 R, 288, 290

[56] References Cited

OTHER PUBLICATIONS

Cheo et al., "Efficient Wire–Grid Duplexer Polarizer for $CO_2$ Lasers," Applied Physics Letters, vol. 18, No. 12, June 15, 1971, pp. 565–567.

Garvin et al., "Wire Grid Polarizers for 10.6 $\mu$m Radiation," IEEE/OSA Conf. on Laser Eng. & Applications, Digest of Techn. Papers, Wash. D.C., May 30 – June 1, 1973.

Danielewicz et al., "Hybrid Output Mirror for Optically Pumped for Infrared Lasers," Optics Communications, vol. 13, No. 4, Apr. 1975, pp. 366–369.

*Primary Examiner*—John K. Corbin
*Assistant Examiner*—Richard A. Rosenberger
*Attorney, Agent, or Firm*—Glenn H. Bruestle; George E. Haas

[57] ABSTRACT

An optical substrate has an electrically conductive grating on one surface. Over the grating is a multilayered dielectric coating.

8 Claims, 2 Drawing Figures

POLARIZATION-SELECTIVE LASER MIRROR

BACKGROUND OF THE INVENTION

The present invention relates to laser mirrors and particularly to polarizing laser mirrors.

In order to achieve a well polarized laser, it is necessary to introduce within the laser cavity a device which exhibits a polarization selective loss. In low gain lasers, a surface pitched at the Brewster angle is usually used to achieve this loss. This surface can take the form of a tube window or perhaps a Littrow prism and mirror. Both of these approaches are relatively expensive since both require angular alignment and two laser quality optical surfaces.

It is a recognized technique in the long wavelength infrared regions to use gratings made of fine closely spaced metallic wires as polarizers. The dimensions of the wires and the spaces in between them are less than the infrared wavelengths. This technique is considerably expensive, however, due to the intricacies of the wire grating fabrication.

SUMMARY OF THE INVENTION

A polarization selective laser mirror is formed on an optical substrate having an electrically conductive and light reflective grating on one surface. A light reflector is on the one surface over the grating.

DETAILED DESCRIPTION OF THE INVENTION

Figure 1:
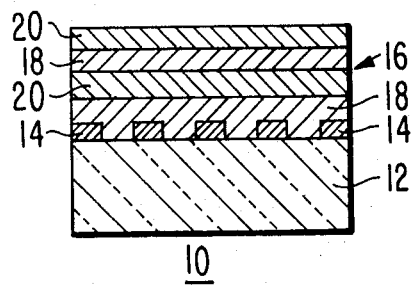
FIG. 1 shows the polarization-selective laser mirror of the present invention.

With initial reference to FIG. 1, a polarization-selective laser mirror, generally designated as 10, comprises an optical substrate 12, such as glass, having a grating 14 on one surface and a multilayer dielectric coating 16 over the grating. The grating 14 is composed of equally spaced parallel stripes of a light reflective and electrically conductive material, such as gold, which extend the full length of the substrate 12. The stripes have a periodicity which is less than half the wavelength of the light to be reflected by the mirror.

The dielectric coating 16 is composed of alternate quaterwave thick layers 18 and 20 of two dielectric materials which have different indices of refraction. For example, zinc sulfide and thorium fluoride are two possible dielectric materials. As light passes through the dielectric coating 16, it is partially reflected at each layer interface. The dielectric coating 16 has a sufficient number of layers, depending upon the wavelength of the light, to reflect most of the light before it reaches the grating 14.

The combination of the dielectric coating 16 and the grating 14 on the substrate 12 provide a single surface for polarizing light in a laser. The multilayered dielectric coating 16 might have for example an overall reflectivity of perhaps 90%. The grating 14 might also have a reflectivity of 90% for the light polarized perpendicular to the grating stripes and a reflectivity of 20% for light polarized parallel to the grating stripes. Thus in a rough approximation, the total mirror structure might have a reflectivity of 99% for the polarization perpendicular to the grating and a reflectivity of 92% for the parallel polarization. This difference (7%) in reflectivity is sufficient to insure lasing only for the high reflectivity polarization.

Figure 2:
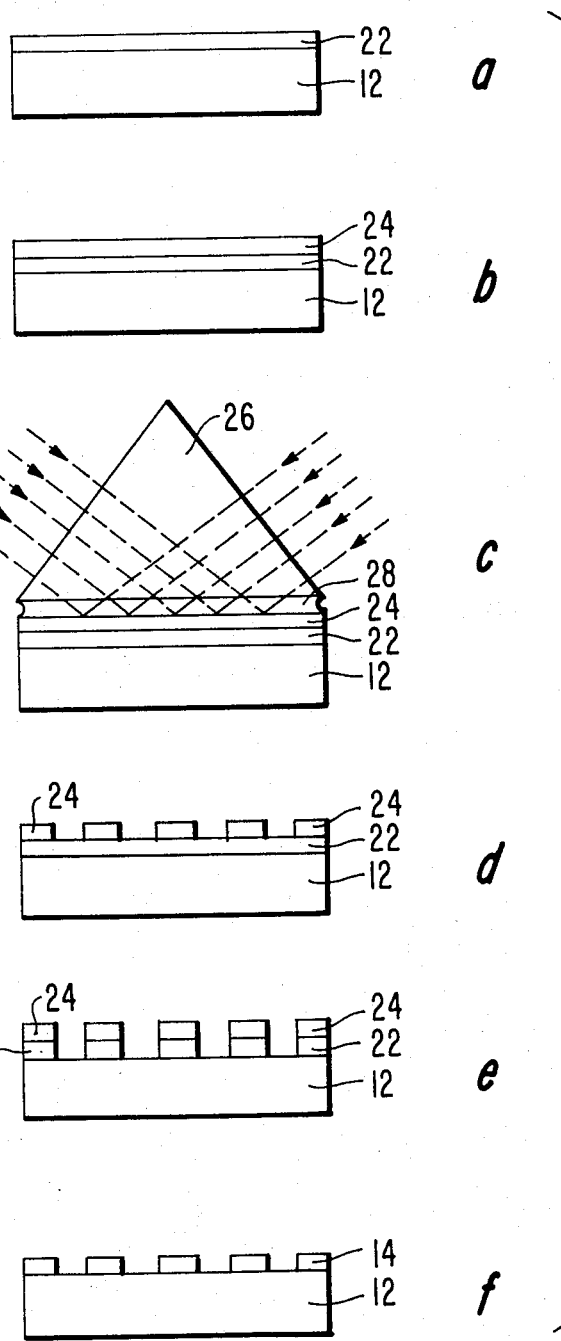
FIG. 2 shows the step-by-step process for producing the polarization-selective laser mirror of the present invention.

The steps of fabricating the laser mirror in the present invention are shown in FIG. 2. A first layer 22 of a light reflective and electrically conductive material, such as gold, is deposited onto a laser quality optical substrate 12 as shown in FIG. 2 a. A photoresist layer 24 is then deposited onto the first layer 22 as shown in FIG. 2 b. The photoresist 24 is then exposed to an interference pattern formed by two short wavelength plane waves. The interference pattern has a repeating line pattern which is finer than half the wavelength of light which is to be reflected by the laser mirror. In FIG. 2 c, a triangular prism 26 and an immersion fluid 28 are used to form a very fine sinusoidal interference pattern on the photoresist layer 24. Any of several well known immersion fluids having an index of refraction closely approximating that of the prism 26 may be used. The surface of the photoresist layer 24 is covered with a thin layer of the immersion fluid 28 and the prism 26 is then placed on the immersion fluid. Light having a very narrow spectral bandwith is shown through two surfaces of the triangular prism (as indicated by the dashed lines in FIG. 2 c ) to form the interference pattern on the surface of the photoresist layer 24. A laser may be used as a light source. For example, if the interference pattern is to have a repeat spacing of 0.17 micron, the light can come from a helium-cadmium laser thereby having a wavelength of 4416 A. The light beams enter the opposite faces of the prism 26 at an angle of about 120° to one other. The prism and the immersion fluid have an index of refraction of about 1.5.

The exposed photoresist layer 24 is then developed as shown in FIG. 2 d. With reference to FIG. 2 e, the surface on which the photoresist layer 24 has been deposited is then etched to dissolve the exposed portions of the first layer 22. The remainder of the photoresist layer 24 is then removed as shown in FIG. 2 f leaving a grating 14 formed from the first layer 22. The various layers of the dielectric coating 16 are then deposited over the grating 14 to yield a laser mirror as shown in FIG. 1.

When the dielectric coating is deposited over the gratings 14, a slight rippling may occur in the stack due to the spacing between the grating stripes. In order to avoid this rippling, the gaps between the grating stripes may be filled with a transparent material. Another alternate in the above method to avoid this rippling of the dielectric coating comprises etching grooves directly into the substrate 12 before the formation of the first layer 22. This etching may be accomplished by a similar technique to the one which is used to etch the first layer 22. This etching forms troughs in the surface of the substrate 12 which are then filled with the electrically conductive and optically reflective grating material. This forms the gratings 14 in the substrate surface which are then covered with the dielectric coating.

I claim:

1. A polarization-selective laser mirror comprising:
   an optical substrate;
   a light reflective and electrically conductive grating on one surface of the substrate; and
   a partial light reflector on the substrate over the grating which will reflect the same wavelength of light as the grating.

2. The laser mirror as in claim 1 wherein the light reflector comprises a multilayer dielectric coating formed of two dielectric materials with different indices of refraction.

3. The laser mirror as in claim 2 wherein each layer of dielectric coating has a thickness equal to one fourth the wavelength of the light to be reflected by the mirror.

4. The laser mirror as in claim 3 wherein the dielectric coating is formed of alternate layers of zinc sulfide and thorium fluoride.

5. The laser mirror as in claim 1 wherein the grating is formed of gold.

6. The laser mirror as in claim 1 wherein the grating comprises a plurality of equally spaced parallel stripes, the stripes having a periodicity which is less than half the wavelength of the light to be reflected by the mirror.

7. A method for forming a polarization-selective laser mirror comprising the steps of:
  depositing a layer of light reflective and electrically conductive material onto an optical substrate;
  depositing a photoresist material onto the layer;
  exposing the photoresist material to a light interference pattern by coating the surface of the photoresist material with an immersion fluid, placing on the immersion fluid a prism having an index of refraction which matches the index of refraction of the immersion fluid and shinning light through the phases of the prism to establish an interference pattern on the surface of the photoresist material;
  developing the photoresist material;
  etching the layer which has been exposed by the developed photoresist material so as to completely remove the exposed portion of the layer;
  removing the photoresist material; and
  depositing a multi-layered dielectric coating of partially light reflecting material which will reflect the same wavelength of light as the light reflective and electrically conductive material, over the remaining portion of the layer.

8. The method as in claim 7 including depositing a transparent material in the spaces of the grating prior to the deposition of the dielectric coating.

* * * * *